United States Patent [19]

Hanna et al.

[11] Patent Number: 5,412,070
[45] Date of Patent: May 2, 1995

[54] POLYKETONE COPOLYMERS OF HIGH BULK DENSITY AND NON-REACTIVITY

[75] Inventors: Paul K. Hanna, East Windsor, N.J.; Teresa M. Cheron, Yonkers, N.Y.

[73] Assignee: Akzo Nobel N.V., Arnhem, Netherlands

[21] Appl. No.: 96,798

[22] Filed: Jul. 22, 1993

Related U.S. Application Data

[62] Division of Ser. No. 898,627, Jun. 15, 1992, abandoned.

[51] Int. Cl.6 .............................................. C08G 67/02
[52] U.S. Cl. .................................... 528/392; 528/271
[58] Field of Search ................................ 528/392, 271

[56] References Cited

U.S. PATENT DOCUMENTS

| | | | |
|---|---|---|---|
| 3,694,412 | 9/1972 | Nozaki | 528/392 |
| 4,778,876 | 10/1988 | Doyle et al. | 528/392 |
| 4,808,699 | 2/1989 | Van Broekhoven et al. | 528/392 |
| 4,882,417 | 11/1989 | Geuze | 528/392 |
| 4,914,183 | 4/1990 | Geuze et al. | 528/392 |
| 4,921,938 | 5/1990 | Drent | 528/392 |
| 4,940,776 | 7/1990 | Bakkum et al. | 528/392 |
| 4,948,870 | 8/1990 | Van Doorn et al. | 528/392 |
| 5,049,630 | 9/1991 | Smutny | 525/539 |
| 5,055,552 | 10/1991 | Wong | 528/392 |
| 5,145,947 | 9/1992 | Mastenbroek et al. | 528/392 |
| 5,155,208 | 10/1992 | Van Broekhoven et al. | 528/392 |
| 5,210,178 | 5/1993 | Keijsper | 528/392 |
| 5,210,311 | 5/1993 | Wong | 568/17 |
| 5,212,135 | 5/1993 | Keijsper et al. | 502/162 |
| 5,216,120 | 6/1993 | Drent et al. | 528/392 |
| 5,227,464 | 7/1993 | Keijsper | 528/392 |

FOREIGN PATENT DOCUMENTS

| | | |
|---|---|---|
| 0248483 | 1/1991 | European Pat. Off. |
| 0443687 | 8/1991 | European Pat. Off. |
| 0506168 | 9/1992 | European Pat. Off. |
| 0520584 | 12/1992 | European Pat. Off. |

*Primary Examiner*—John Kight, III
*Assistant Examiner*—Terressa M. Mosley
*Attorney, Agent, or Firm*—Richard P. Fennelly; Louis A. Morris

[57] ABSTRACT

Polyketones can be formed in enhanced yield by conducting the polymerization of the carbon monoxide and olefin monomers used to form the polyketone in a gas phase polymerization process in the presence of an effective amount of a liquid, non-polymerizable diluent which is effective in increasing the amount of polyketone formed over that which would be formed in the substantial absence of the diluent. Preferably, the catalyst is supported on a high surface area support (e.g., a carbon monoxide-ethylene high surface area support). Hydrogen gas can be used to reduce the molecular weight and increase the bulk density and thermal stability of the polyketone product.

6 Claims, No Drawings

POLYKETONE COPOLYMERS OF HIGH BULK DENSITY AND NON-REACTIVITY

This is a division of application Ser. No. 07/898,627 filed Jun. 15, 1992, now abandoned.

BACKGROUND OF THE INVENTION

It is known to form polyketones by the polymerization of carbon monoxide and one or more olefins by a vapor phase polymerization process. For example, U.S. Pat. No. 4,778,876 of M. J. Doyle et al. describes such a process in which the monomers are contacted with the catalyst compositions in the substantial absence of a liquid, non-polymerizable diluent. Any small quantity of diluent that might be present is vaporized and present in exclusively the gaseous state (Col. 1, lines 35–40).

SUMMARY OF THE PRESENT INVENTION

The present invention relates to a gas phase process for catalytically polymerizing carbon monoxide and at least one olefin to produce a polyketone. The particular improvement in the process of the present invention is conducting the polymerization in the presence of an effective amount of a liquid, non-polymerizable diluent which increases the amount of polyketone that is formed in the process. In one preferred embodiment of the process a ketone, such as acetone, is used with the addition of hydrogen to yield a product of reduced molecular weight, increased bulk density, and increased thermal stability.

DETAILED DESCRIPTION OF THE PRESENT INVENTION

The aforementioned U.S. Pat. No. 4,778,876 is incorporated herein by reference for its generalized teaching of how polyketones can be formed by vapor phase polymerization processes in regard to the types of monomers which can be used and the types of catalysts which can be utilized. As indicated before, polymers of carbon monoxide and an olefin, such as ethylene, propylene or combinations of ethylene and propylene is an area of known expertise. Such monomers can be polymerized into high molecular weight linear alternating polymers of carbon monoxide and the olefin or olefins that are chosen by using a catalyst which comprises a compound of a Group VIII metal, such as palladium, cobalt and nickel, an anion of a non-hydrohalogenic acid having a $pK_a$ of less than about six and an appropriate polydentate ligand such as a bidentate ligand of the type shown in the aforementioned U.S. Pat. No. 4,778,876.

In the vapor phase process shown in U.S. Pat. No. 4,778,876 it is taught that the monomers need to be contacted with the catalyst composition in the substantial absence of a liquid non-polymerizable diluent such as a monohydric alcohol having from one to four carbon atoms.

In accordance with the present invention it has been unexpectedly found that the amount of polyketone product that can be formed in a vapor phase polymerization process of the general type set forth in U.S. Pat. No. 4,778,876 can be dramatically increased by not removing substantially all of the liquid, non-polymerizable diluent but allowing a certain amount to remain. In general terms, the amount that is allowed to remain should not be so large as to produce a visually identifiable amount of free liquid so as to qualify the polymerization reaction as a solution or suspension polymerization reaction. If the amount of diluent which is allowed to remain is expressed in terms of the amount of catalyst, it could range from about one equivalent of diluent for every equivalent of catalyst up to several thousand (e.g., about 2000–5000) equivalents of solvent per equivalent of catalyst, especially when the catalyst is supported on a porous high surface area support which can adsorb liquid diluent that might be present. In the case of use of such a supported catalyst, the diluent can range from about 5% to about 200% or more by weight of substrate (e.g., in those cases in which the polymerization catalyst is supported on a polymer substrate), so that the amount which remains results in an increase in the amount of polyketone polymer formed per gram of metal in the catalyst system which is used.

The type of solvent which is to be allowed to remain in a small controlled amount herein should be those which are capable of coordinating to a metal. Especially preferred are those solvents containing an oxygen or nitrogen atom (or both) so as to be capable of coordinating to the metal in the catalyst via the unbonded electrons on the oxygen and/or nitrogen atom therein. Examples of suitable solvents include acetonitrile, such ketones as acetone, and such alcohols as methanol. Solvents containing phosphorus or sulfur atoms are also contemplated for use.

In regard to the catalyst to be used, it is preferred that the catalyst be placed on a high surface area support. For example, an inorganic support such as silica can be used as long as the potential contaminating effects of the support can be tolerated. An alternative support is a high surface area polyketone (e.g., carbon monoxide-ethylene formed by solution or suspension polymerization). As earlier mentioned, the general types of monomers and catalyst described in U.S. Pat. No. 4,778,876 can be used in accordance with the present invention.

In one embodiment of the present invention, it has been found that hydrogen gas can be added to the polymerization medium to produce a more thermally stable product having a higher bulk density and a reduced molecular weight. Hydrogen gas will produce a polyketone product having a much higher proportion of less reactive alkyl end groups and a correspondingly lower amount of more reactive vinyl, ester, alkoxy, or acid end groups. For example, it has been found that a tapped bulk density of 0.66 g/ml was obtained when acetone was the diluent and 17 bar of hydrogen was added for a total pressure of about 82 bar. Moreover, such a product exhibited good thermal stability and had a $C_2/C_1$ value of 0.47 using the procedure shown in U.S. Pat. No. 5,049,630, which is incorporated herein by reference in regard to its description of such procedure. When the hydrogen addition was 10 bar for a total pressure of about 82 bar, the bulk density was 0.63 g/ml. Use of the process when no hydrogen addition was made for a total pressure of about 82 bar resulted in a significantly less thermally stable product with a $C_2/C_1$ value of 0 and a lower bulk density of 0.37 g/ml.

The product resulting from the instant process with a ketone diluent in which hydrogen addition is preferably used, is deemed to be novel in various respects. For one thing, it can have a bulk density of higher than about 0.60 g/ml, which is above the 0.55 g/ml value shown in U.S. Pat. No. 4,914,183 (Example 4). The use of hydrogen will decrease end vinyl unsaturation that might be present in the polyketone formed with use of the ketone solvent (e.g., acetone) thereby giving an essentially alkyl group-end capped product. Such a product will be substantially free of the more reactive vinyl, ester, alkoxy, or acid end groups.

The present invention is further illustrated by the Examples which follow.

COMPARATIVE EXAMPLE 1

This Example illustrates the inferior results that were obtained when an essentially vapor phase polymerization of carbon monoxide and ethylene was carried out in the substantial absence of a liquid non-polymerizable diluent.

The catalyst preparation that was employed in this Example was a modification of that used in European Patent Publication No. 301,664, Example 3. The catalyst for the reaction was prepared as follows: 0.11 g palladium acetate, 0.22 g toluenesulfonic acid, and 0.22 g of 1,3-bis(diphenylphosphino) propane were placed in a flask with a stir bar. To this was added 20 ml of dry acetone and 14 ml of dry acetonitrile. The mixture was then stirred for ten minutes at room temperature and was then warmed to 50° C. for five minutes. This resulted in formation of a clear yellow solution. The solution was cooled to 30° C., and the solvent was removed under vacuum. The product was a yellow solid which was then dissolved in 50 ml of dry acetone for spraying on a high surface area polymer substrate (i.e., carbon monoxide-ethylene formed by solution polymerization).

The polymer substrate was placed in a round bottom flask under nitrogen and was wetted with enough acetone so that not all of the acetone was absorbed by the polymer, i.e., there was a small amount of free acetone visible on the walls of the flask. The polymer sample (weighing 171 g) required approximately 300 ml of acetone to reach this point.

The solution of catalyst was then sprayed onto the wet polymer substrate while the substrate flask was vigorously shaken to ensure even dispersion of the catalyst. The polymer substrate with catalyst coated on it was then dried under vacuum to remove substantially all liquid solvent. The dry powder was then placed in an autoclave which was then flushed with nitrogen and pressurized to 82 bar with a 1:1 weight ratio of carbon monoxide:ethylene at a temperature of 65° C.

The data given below shows the sequential growth of a sample of polymer which was formed through such a polymerization process and which was then used as the polymer substrate.

| Weight in (g) | Weight out (g) | Time (hours) | LVN 100° C., m-Cresol | Productivity (g polymer/g Pd/Hr) |
| --- | --- | --- | --- | --- |
| 171 | 251 | 24 | 2.4 | 62.3 |
| 241 | 363 | 24 | 2.8 | 96.2 |
| 357 | 549 | 24 | 3.0 | 151. |
| 540 | 909 | 72 | 3.1 | 96.7 |

COMPARATIVE EXAMPLE 2

The following table shows the results of a similar sequential reaction to that described in the previous Example in which the polymer substrate was formed through a solution process and was then coated with catalyst. Additionally, the catalyst charge was three times as large as in Example 1 (i.e., 0.33 g of palladium acetate, 0.66 g p-toluenesulfonic acid, and 0.66 g of 1,3-bis(diphenylphosphino) propane), and the reaction was performed for a much longer time:

| Weight in (g) | Weight out (g) | Time (hours) | LVN 100° C., m-Cresol | Productivity (g polymer/g Pd/Hr) |
| --- | --- | --- | --- | --- |
| 125 | 2600 | 137 | 6.6 | 114 |

EXAMPLE 3

This illustrates the superior results in regard to polymer productivity when the solvent-impregnated support containing the catalyst does not have the liquid non-polymerizable diluent substantially removed before the vapor phase polymerization.

The following table shows the results of a similar reaction to that shown in the previous Example in which the polymer substrate was formed through a solution process then coated with catalyst. There was no evaporation of the acetone solution used to coat the catalyst onto the substrate. There was no free acetone in solution form, and the coated substrate was handled as if it were simply a solid even though residual solvent remained as defined in Comparative Example 1. Additionally, the catalyst charge was three times as large as Example 1 (i.e., 0.33 g palladium acetate, 0.66 g p-toluenesulfonic acid, and 0.66 g of 1,3-bis(diphenylphosphino) propane). Finally, 4 bar of $H_2$ were added to reduce the molecular weight of the product, increase the bulk density, and potentially improve the thermal stability of the polyketone product. Improved thermal stability can be of importance, for example, if the polyketone product is to be melt spun into fibers. Use of hydrogen as a molecular weight regulator is not deemed to materially affect productivity.

| Weight in (g) | Weight out (g) | Time (hours) | LVN | Productivity (g polymer/g Pd/Hr) |
| --- | --- | --- | --- | --- |
| 100 | 5500 | 17 | 1 | 2000 |

The foregoing Examples are being provided for illustrative purposes only and should not be construed in a limiting sense. The scope of protection which is sought is set forth in the claims which follow.

We claim:

1. A copolymer of carbon monoxide and an olefin having a bulk density of above about 0.60 g/ml which is substantially free of reactive groups selected from the group consisting of vinyl, ester, alkoxy or acid end groups and which essentially contains alkyl end groups.

2. A copolymer as claimed in claim 1 wherein the olefin is ethylene.

3. A copolymer as claimed in claim 1 having a bulk density of from 0.60 to 0.66 g/ml.

4. A copolymer as claimed in claim 1 having a bulk density of from 0.60 to 0.63 g/ml.

5. A copolymer as claimed in claim 2 having a bulk density of from 0.60 to 0.66 g/ml.

6. A copolymer as claimed in claim 2 having a bulk density of from 0.60 to 0.63 g/ml.

* * * * *